United States Patent
Broen et al.

(10) Patent No.: US 10,664,132 B2
(45) Date of Patent: May 26, 2020

(54) PRINTED USER INTERFACE

(71) Applicant: PEPSICO, INC., Purchase, NY (US)

(72) Inventors: Martin Eduardo Broen, New York, NY (US); Dominick Salvato, North Salem, NY (US); Peter Randall Daly, Yorktown Hgts., NY (US)

(73) Assignee: PepsiCo, Inc., Purchase, NY (US)

( * ) Notice: Subject to any disclaimer, the term of this patent is extended or adjusted under 35 U.S.C. 154(b) by 536 days.

(21) Appl. No.: 15/130,547

(22) Filed: Apr. 15, 2016

(65) Prior Publication Data

US 2016/0306510 A1 Oct. 20, 2016

Related U.S. Application Data

(60) Provisional application No. 62/149,290, filed on Apr. 17, 2015.

(51) Int. Cl.
| | |
|---|---|
| *B67D 1/08* | (2006.01) |
| *G06F 3/0482* | (2013.01) |
| *G06F 3/0354* | (2013.01) |
| *G06F 3/01* | (2006.01) |
| *G06F 3/0484* | (2013.01) |

(Continued)

(52) U.S. Cl.
CPC ............ *G06F 3/0482* (2013.01); *G06F 3/011* (2013.01); *G06F 3/03547* (2013.01); *G06F 3/04842* (2013.01); *G06F 3/04883* (2013.01); *B67D 1/0034* (2013.01); *B67D 1/0888* (2013.01); *B67D 1/1236* (2013.01); *B67D 2001/009* (2013.01); *G06F 3/04886* (2013.01)

(58) Field of Classification Search
CPC .............. G06F 3/0482; G06F 3/04886; G06F 3/03547; G06F 3/04883; G06F 3/011; G06F 3/04842; G06F 3/041; G06F 3/042; B67D 2001/009; B67D 1/1236; B67D 1/0888; B67D 1/0034; B67D 7/06
See application file for complete search history.

(56) References Cited

U.S. PATENT DOCUMENTS

| | | | |
|---|---|---|---|
| 6,072,980 A | 6/2000 | Manico et al. | |
| 6,401,969 B1 | 6/2002 | Yajima et al. | |

(Continued)

FOREIGN PATENT DOCUMENTS

| | | |
|---|---|---|
| EP | 2545533 A1 | 1/2013 |
| JP | 2002-312838 A | 10/2002 |

(Continued)

OTHER PUBLICATIONS

International Search Report and Written Opinion of the International Searching Authority for International Application No. PCT/US2016/027850, dated Sep. 2, 2016.

*Primary Examiner* — Nicolas A Arnett
(74) *Attorney, Agent, or Firm* — Sterne, Kessler, Goldstein & Fox P.L.L.C.

(57) ABSTRACT

Methods and apparatuses are disclosed that, in some aspects, provide for a cost-reduced touch sensitive user interface including a static printed display. The methods and systems may include providing illumination to guide a user through interaction with a touch sensitive user interface. The methods and systems may include a configurable printed display. Further aspects are disclosed providing use of a cost-reduced touch user interface in a beverage dispensing apparatus.

16 Claims, 15 Drawing Sheets

(51) Int. Cl.
*G06F 3/0488* (2013.01)
*B67D 1/00* (2006.01)
*B67D 1/12* (2006.01)

(56) References Cited

U.S. PATENT DOCUMENTS

| | | | |
|---|---|---|---|
| 8,757,222 B2* | 6/2014 | Rudick | B67D 1/0888 141/198 |
| 9,052,536 B2* | 6/2015 | Artwohl | A47F 3/0434 |
| 9,511,988 B2* | 12/2016 | Hernandez | B67D 1/0888 |
| 9,689,603 B2* | 6/2017 | Roh | G02F 1/133377 |
| 9,886,185 B2* | 2/2018 | Abrach | G06F 3/0488 |
| 2005/0252933 A1 | 11/2005 | Manisco | |
| 2007/0114244 A1 | 5/2007 | Gatipon et al. | |
| 2009/0065336 A1 | 3/2009 | Bayley et al. | |
| 2009/0262085 A1 | 10/2009 | Wassingbo et al. | |
| 2012/0285089 A1 | 11/2012 | Artwohl et al. | |
| 2013/0063358 A1 | 3/2013 | Huang | |
| 2013/0106690 A1 | 5/2013 | Lim | |
| 2014/0106125 A1 | 4/2014 | Tatai | |
| 2014/0261858 A1 | 9/2014 | Mattos, Jr. et al. | |
| 2015/0082243 A1 | 3/2015 | Taylor et al. | |

FOREIGN PATENT DOCUMENTS

| | | |
|---|---|---|
| JP | 2005-189991 A | 7/2005 |
| JP | 2006-517167 A | 7/2006 |
| JP | 2009-044225 A | 2/2009 |
| JP | 2009-514746 A | 4/2009 |
| JP | 2011-100259 A | 5/2011 |
| JP | 2013-037475 A | 2/2013 |
| JP | 2013-540294 A | 10/2013 |
| JP | 2014-081777 A | 5/2014 |
| JP | 2014-085902 A | 5/2014 |
| TW | 439047 B | 6/2001 |
| WO | WO 2004/030438 A2 | 4/2004 |
| WO | WO-2007/056407 A2 | 5/2007 |
| WO | WO-2011/110944 | 9/2011 |
| WO | WO-2013/067020 A1 | 5/2013 |

* cited by examiner

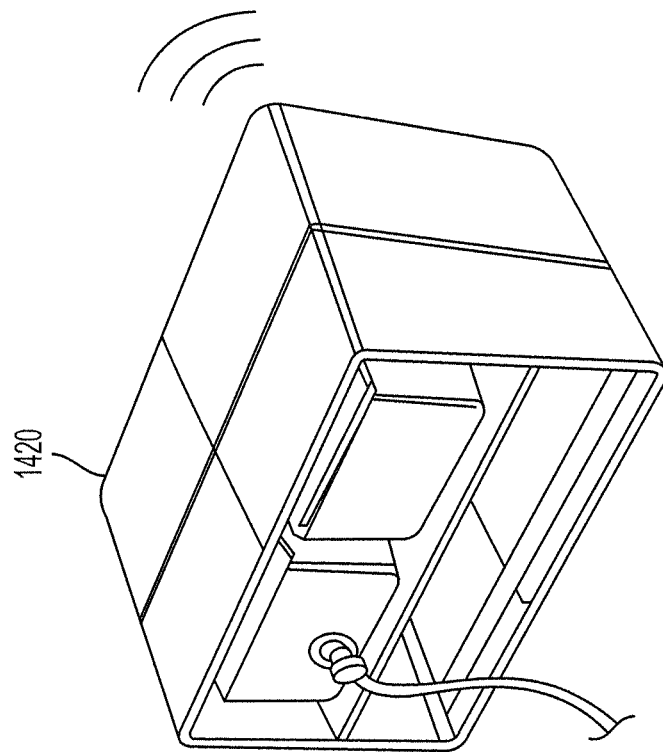
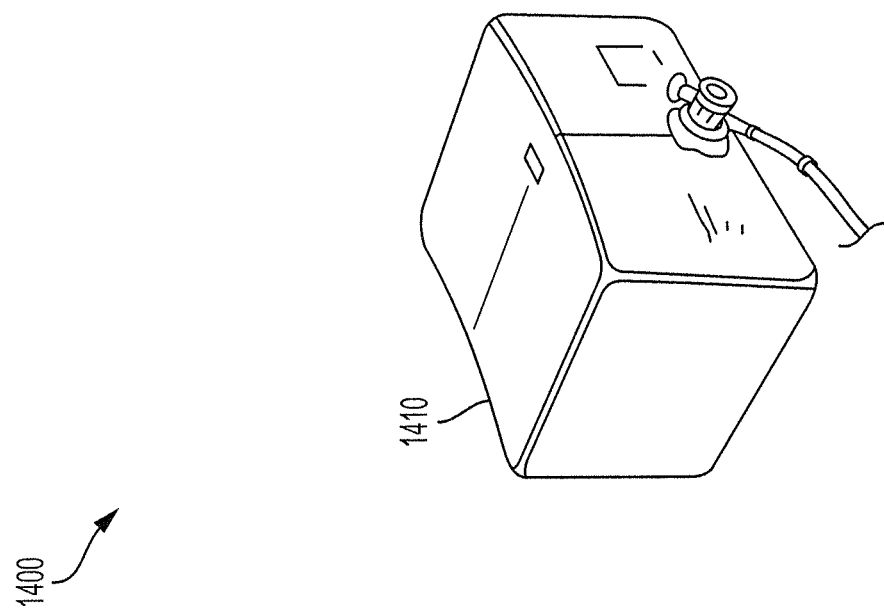
FIG. 14

United States Patent US 10,664,132 B2

PRINTED USER INTERFACE

CROSS-REFERENCE TO RELATED APPLICATION(S)

This application claims priority to U.S. Provisional Application No. 62/149,290, filed on Apr. 17, 2015, which is incorporated herein in its entirety by reference thereto.

BACKGROUND

Touch sensitive displays are typically constructed of a touch sensitive surface, layered over an LCD display. Although touch displays are in wide use in mobile devices and other consumer products, their cost prohibits their use in some other products. For example, many beverage dispensing machines currently do not make use of modern touch user interface capabilities, due to requirements that these dispensing machines be low cost in order to keep beverage prices to a minimum. These beverage dispensing machines may appear old or dated to consumers, who are accustomed to using modern touch user interfaces. Consumers may not enjoy the experience of dispensing beverages from these machines. Therefore, a less expensive implementation of a touch based user interface is needed. In addition, current beverage dispensing machines may contain a number of push button switches for user beverage selection. These switches commonly require maintenance and they may wear out over time and fail to respond to user selection. A more reliable, low maintenance solution would be an improvement over these existing systems. Therefore, improved systems and methods to address these and other shortcomings in the art are desired.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects of the disclosure include an apparatus for providing a low-cost touch sensitive user interface including a printed display. Some aspects include a method using for illumination to guide a user through an interaction.

Other aspects of the disclosure may include a cup with a printed code to enable identification of the cup by use of a capacitive sensor. Other aspects may include methods for beverage dispenser behaviors once a cup is identified.

Aspects of the disclosure relate to level detection of contents in a bag or bladder using printed conductors.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

FIG. 14 illustrates an embodiment of a printed level sensor in accordance with aspects of the present disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
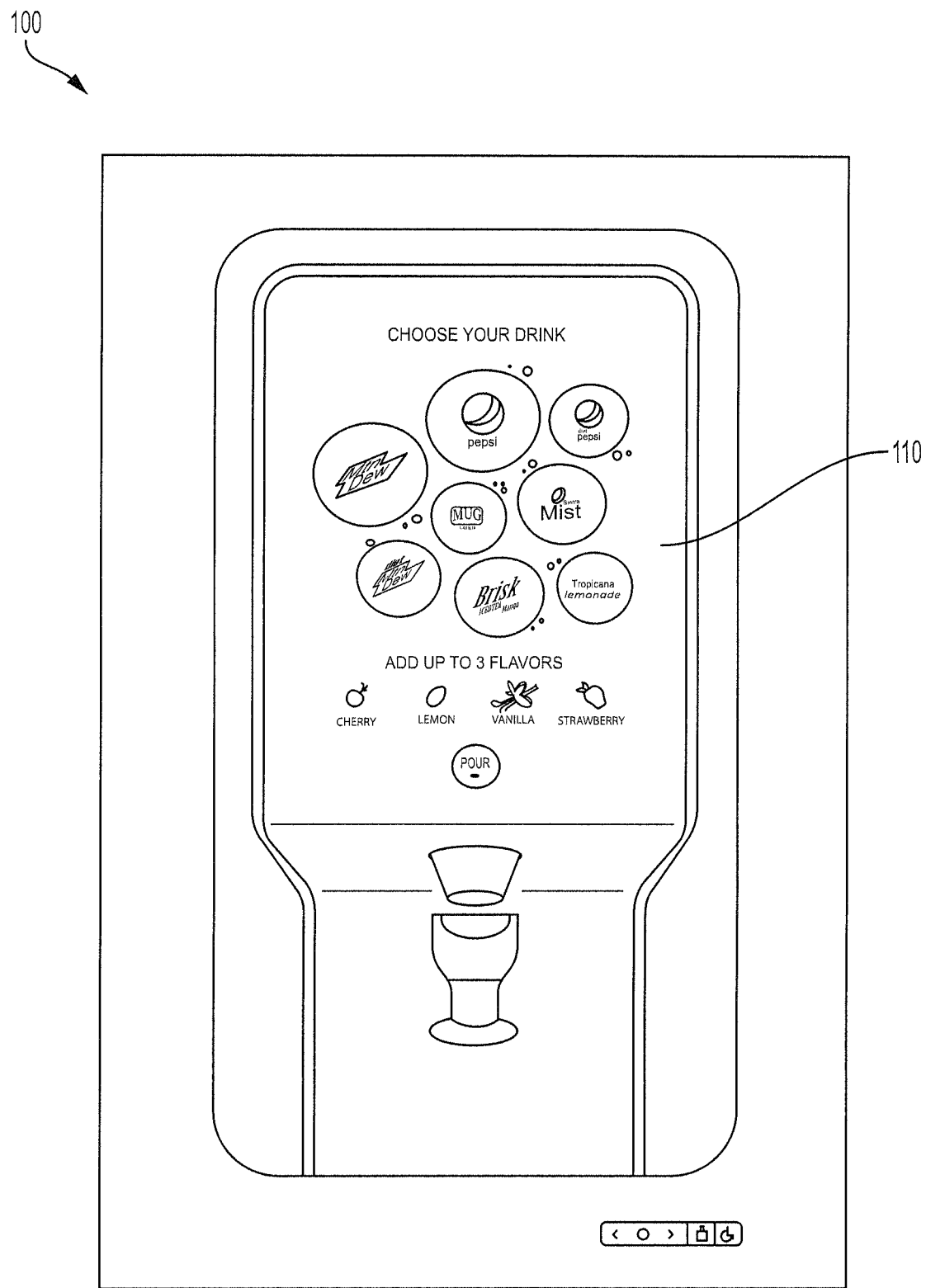
FIG. 1 illustrates an embodiment of a beverage dispenser in accordance with aspects of the present disclosure.

FIG. 1 depicts an example beverage dispenser 100 including a touch display 110 as in some embodiments.

Figure 2:
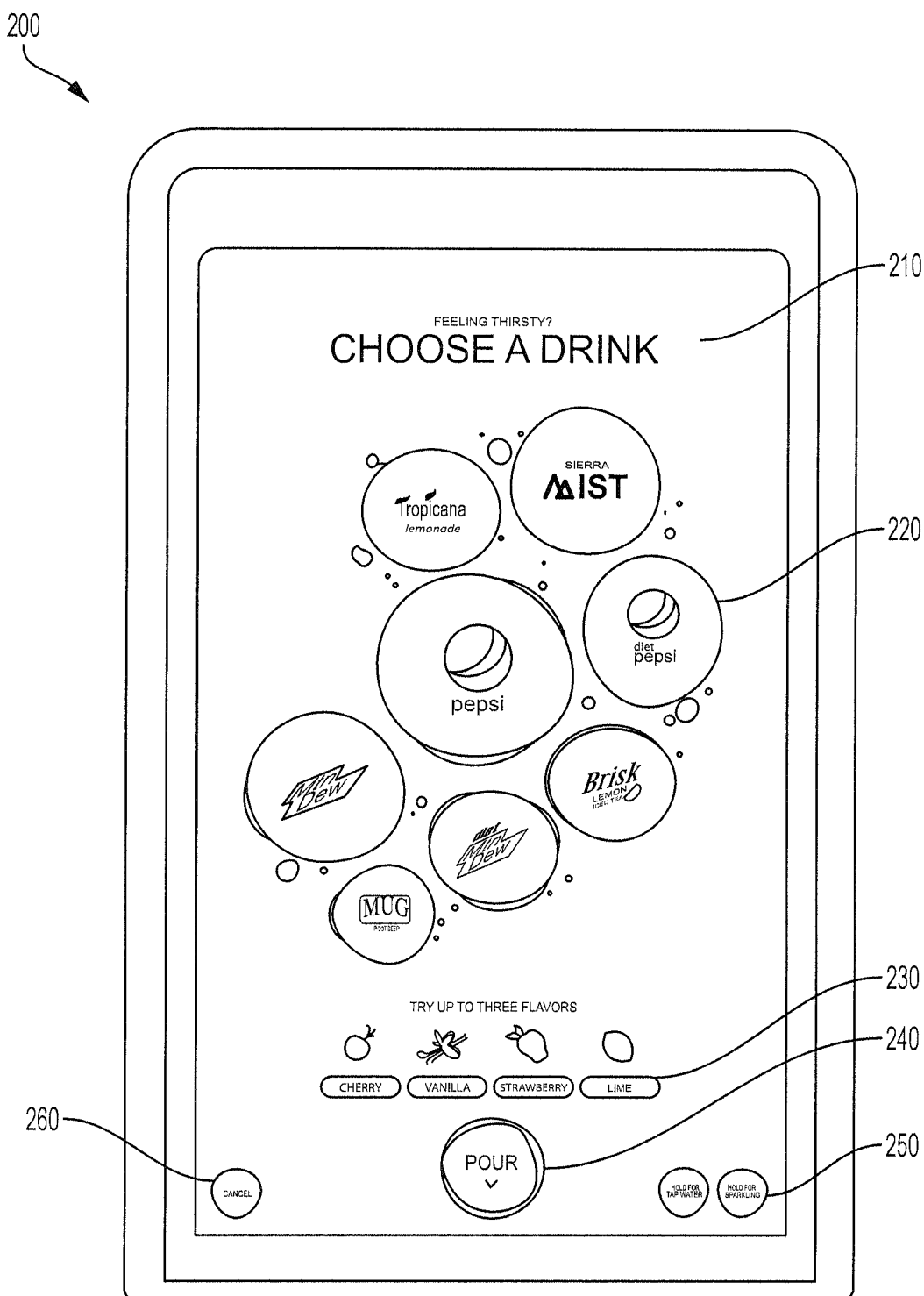
FIG. 2 illustrates an example touch display in accordance with aspects of the present disclosure.

FIG. 2 illustrates an example embodiment of a touch display 200, as may be included in beverage dispenser 100. In some embodiments, touch display 200 may include a title area 210 where graphics, text or other visual information may be placed in order to invite a consumer to make various selections. Touch display 200 may include various beverage options 220 which a user may touch to select. In some embodiments, touch display 200 may include various flavor or ingredient addition or removal options, such as flavor addition selection 230. Some embodiments may include dispensing commands such as pour selection 240, various water dispensing selections 250 and a cancel selection 260. FIG. 2 depicts one of the many possible arrangements, given the disclosure herein.

Figure 3:
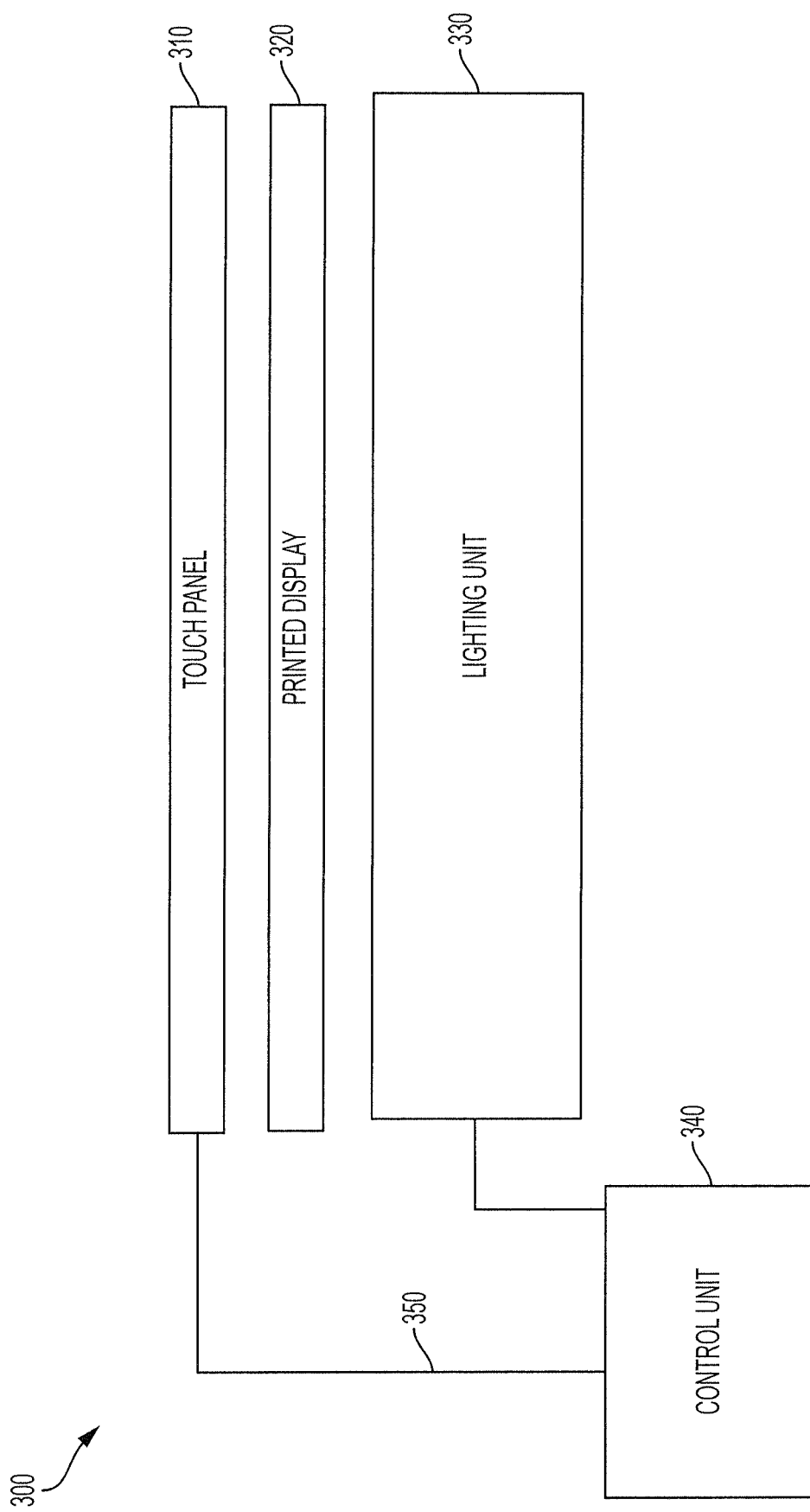
FIG. 3 illustrates an example touch user interface assembly in accordance with aspects of the present disclosure.

FIG. 3 illustrates a touch user interface assembly 300 as may be included in some embodiments of touch display 200. Touch panel 310 may be a projected capacitive touch sensitive panel and may be constructed of various layers, including one or more glass layers, electrode layers, insulating material and adhesives. Touch panel 310 may be transparent, such that images or other visual information may be seen through touch panel 310. Touch panel 310 may support one or more touch sensitive areas, enabling user interaction via touch within those areas. In some embodiments, a single touch area may be used to accept user input. In those embodiments, touch panel 310 may provide coordinates or another indication of a touch position. In other embodiments, multiple touch areas may be provided and user input may be determined based on the area touched.

Control unit 340 may be interfaced with touch panel 310 to receive touch actions from touch panel 310 and to perform other actions, for example, control unit 340 may control a beverage dispensing system to dispense beverages as selected by the user.

Printed display 320 may be positioned behind touch panel 310 and provide images or other visual information to inform a user where to touch and may also provide advertising or decoration. Printed display 320 may include visual markings partitioning printed display 320 into one or more portions which may be selected by a user via touch panel 310. Printed display 320 may be constructed of paper, cardboard, translucent film or other material. In some embodiments, printed display 320 may include one or more layers where each layer may include visual information. Although printed display 320 is referred to as "printed display", any images or visual information may be applied to printed display 320 through various application methods, including printing, painting, photocopying, etc. In some embodiments, the visual information of the printed display may be printed on the back side of the touch surface, rather than comprising a separate layer or component in touch user interface assembly 300.

In some embodiments, printed display 320 may be configured to replace a digital display, for example, as a retrofit in order to reduce cost.

In some embodiments, lighting unit 330 may be positioned behind or otherwise in proximity to printed display 320 to provide illumination of various portions of printed display 320. Lighting unit 330 may include lights, such as LEDs, of various colors, light pipes, lenses or other means to focus or direct light to various portions of printed display 320. In some embodiments, the lenses or light pipes may be movable, so that the lighting can be directed, either manually or under program control by control unit 340.

Control unit 340 may manage the operation of touch display 200. Control unit 340 may include one or more processors, memory and/or discrete logic. In some embodiments, control unit 340 may include a clock, calendaring software, interface to sensors, such as beverage availability or other stock levels. Control unit 340 may be connected to touch panel 310 to operate the touch panel and to receive user input from touch panel 310. For example, in some embodiments, control unit 340 may receive coordinates representing a location on the touch panel touched by a user.

In some embodiments lighting unit 330 may be controlled by control unit 340, to illuminate portions of the printed display sequentially, in response to user input received by touch panel 310. In some embodiments, lighting unit 330 may be controlled to illuminate a particular portion, for example, a portion for user focus or for next user input. Illumination may be applied to help the user move through the steps of an interaction. Control unit 340 may cause lighting unit 330 to illuminate various layers of printed display 320 in embodiments wherein printed display 320 includes multiple layers.

In an embodiment, printed display 320 may be static and non-changing, in contrast to existing touch display implementations which include an LCD display, therefore, other mechanisms have been developed to guide or provide feedback to a user. For example, illumination may be varied in response to a user selection, vibration(s) (haptic feedback) may be generated, for example, by a motor or a piezoelectric device, audible sounds, including a click or beep may be generated upon user input. In some embodiments, various intensities of illumination may be provided, for example, a half intensity (50%) illumination may indicate an available user selectable portion of printed display 320 while a full intensity (100%) illumination may indicate that a user has selected a particular portion. In some embodiments, a background region may be illuminated at a lower percentage of intensity, such as 20% or other percentage. Those skilled in the art may realize that various other intensities of light may be used to provide feedback or guidance to a user. Illumination intensity percentages may be between 0% and 100% in various embodiments. In some embodiments, a user may deselect a previously selected portion whereby the illumination may return to a half intensity to indicate that the portion has been deselected and is again available for selection by the user. In some embodiments, lighting of various colors may be used to guide or provide feedback to a user.

Figure 4:
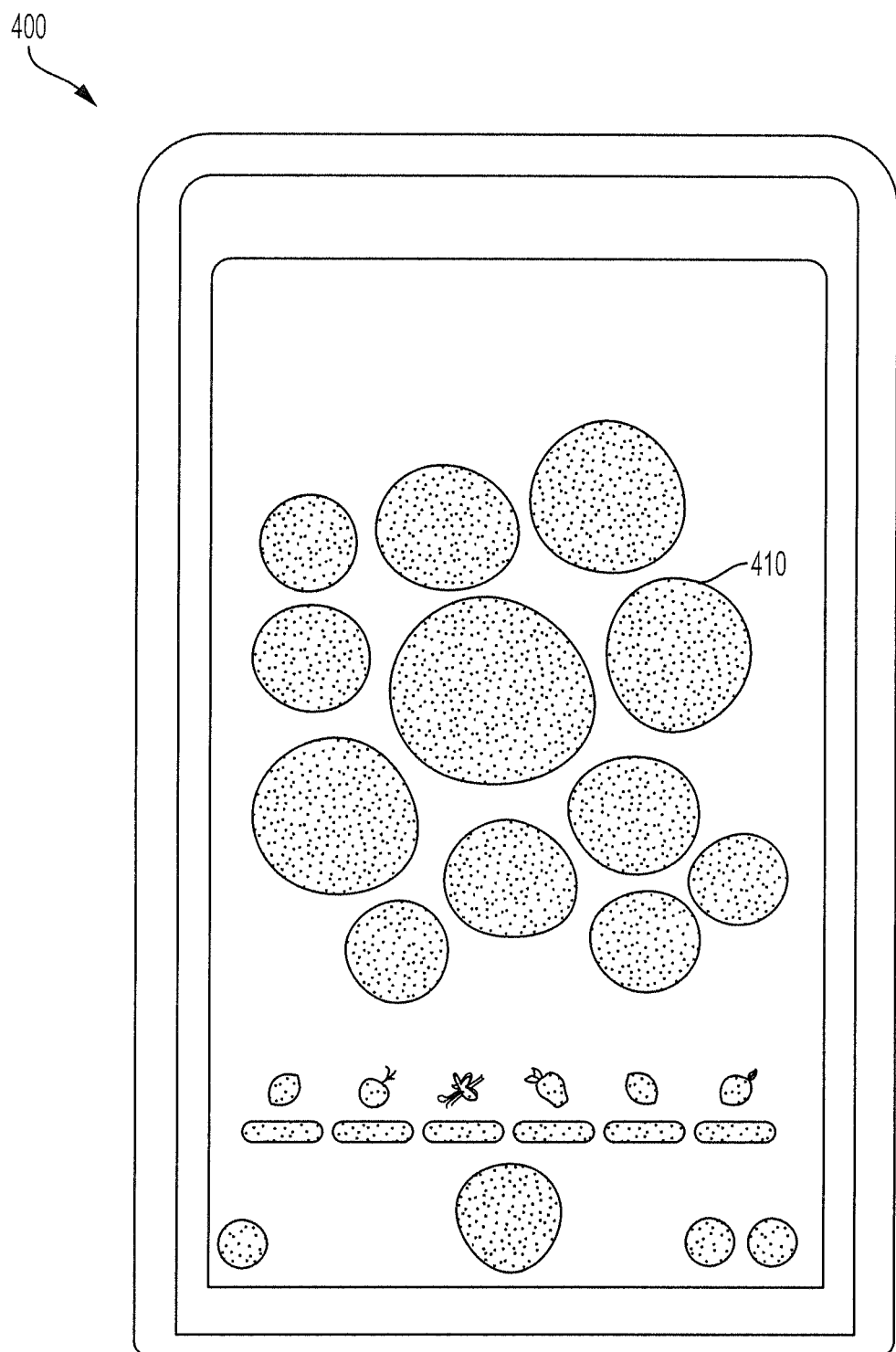
FIG. 4 illustrates an embodiment of a mask layer in accordance with aspects of the present disclosure.

FIG. 4 illustrates an example embodiment of mask layer 400 as may comprise one or more layers of printed display 320. In some embodiments, mask layer 400 may be a layer separate from printed display 320. Mask layer 400 may conceal various portions of printed display 320, such that those portions are not visible to a user unless illuminated by lighting unit 330. Mask layer 400 may include shaded regions 410 to provide visibility of printed display portions behind the mask layer, when illuminated. Shaded regions 410 may be positioned so that they cover portions of the visual information on printed display 320. When illuminated, shaded regions may become transparent, allowing the images or other visual information to be seen through the shaded region 410. Shaded region 410 may be constructed of various films. Control unit 340 may control lighting unit 330 to illuminate various portions of mask layer 400 to make corresponding portions of printed display 320 visible through touch panel 310.

Figure 5:
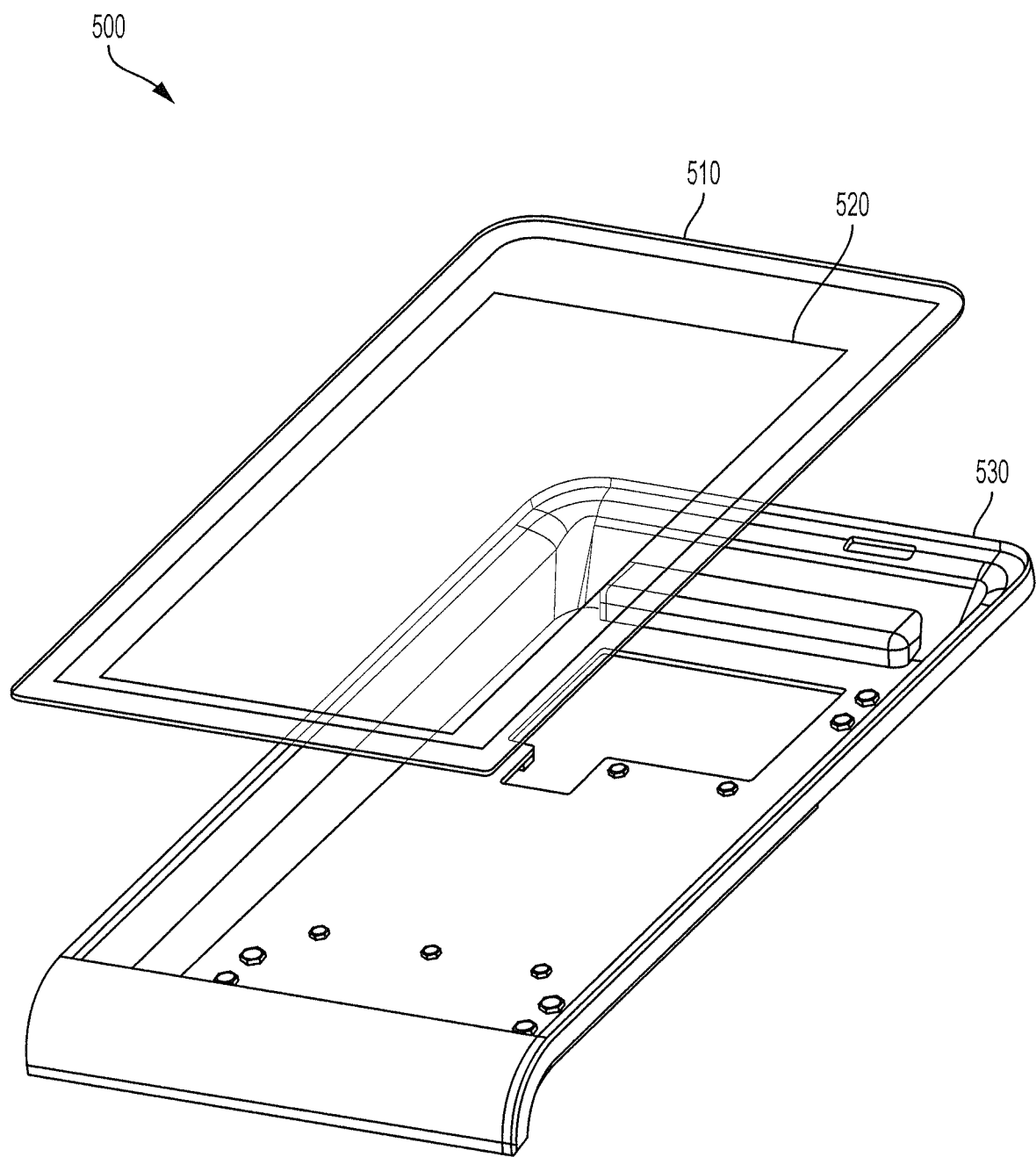
FIG. 5 illustrates an exploded view of components of an example touch user interface assembly in accordance with aspects of the present disclosure.

FIG. 5 illustrates an exploded view of some components of an example touch user interface assembly 500 in accordance with aspects of the present disclosure. Touch user interface assembly 500 may include a touch panel 510, with a touch sensitive area 520. Touch panel 510 may be affixed to supporting frame 530.

Figure 6:
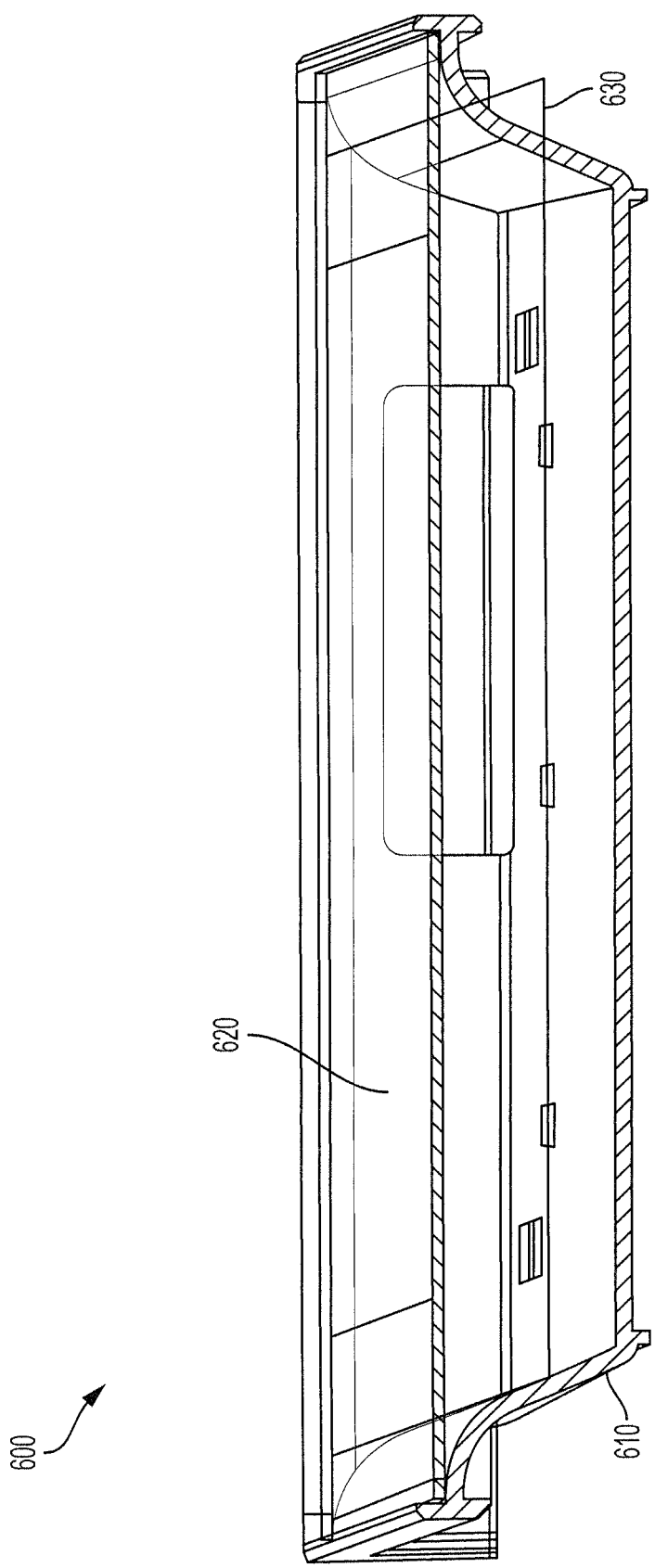
FIG. 6 illustrates a sectional view of components of an example touch user interface assembly in accordance with aspects of the present disclosure.

FIG. 6 illustrates a sectional view of components of an example touch user interface assembly 600 in accordance with aspects of the present disclosure. In some embodiments, printed display 630 may comprise a layer between touch panel 620 and supporting frame 610 so that printed display 630 may be visible to a user, through touch panel 620. In some embodiments, printed display 620 may be replaceable or scrollable, in order to ease configuration or upgrade of the touch user interface assembly 600.

Figure 7:
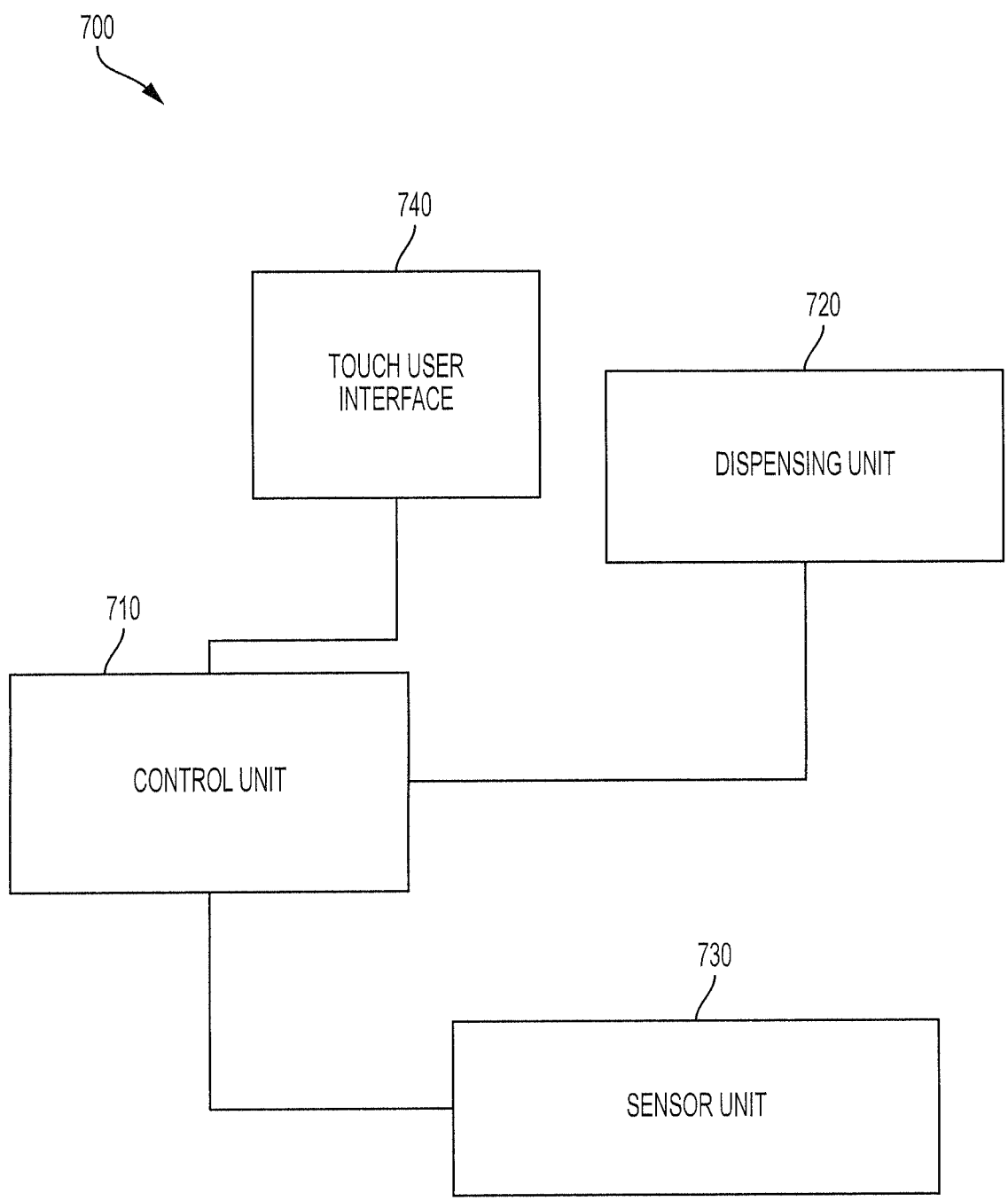
FIG. 7 illustrates a system diagram of an example touch user interface as may be included in a beverage dispensing system in accordance with aspects of the present disclosure.

FIG. 7 illustrates a system diagram 700 of an example beverage dispenser as may be in accordance with aspects of the present disclosure. Control unit 710 may accept user input from touch user interface 740. Responsive to user selection of a beverage via touch user interface 740, control unit 710 may control dispensing unit 720 to dispense the selected beverage. Control unit 710 may receive input from sensor unit 730 related to ingredient levels.

Figure 8C:
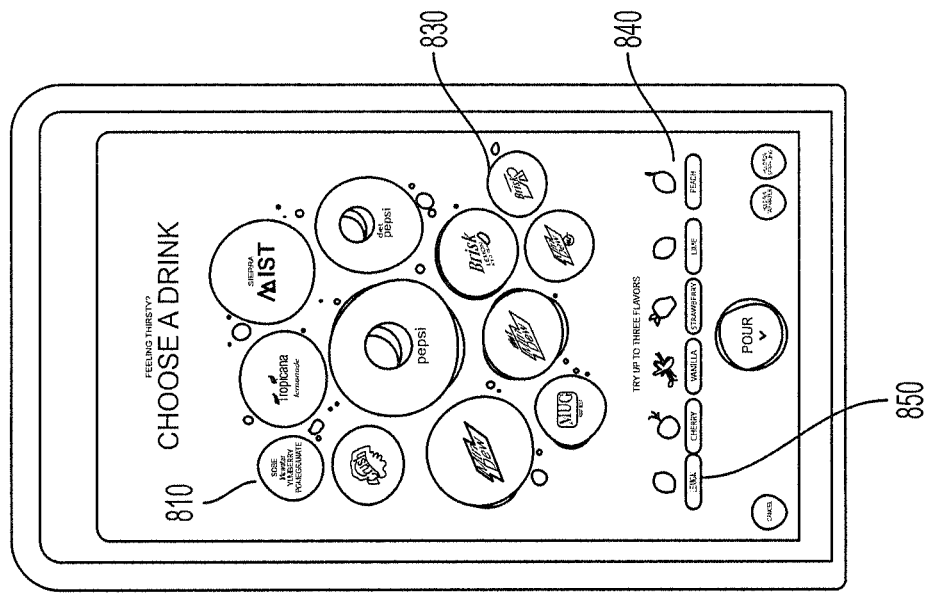
FIGS. 8A-8C illustrate an embodiment of a configurable touch display in accordance with aspects of the present disclosure.
Figure 8B:
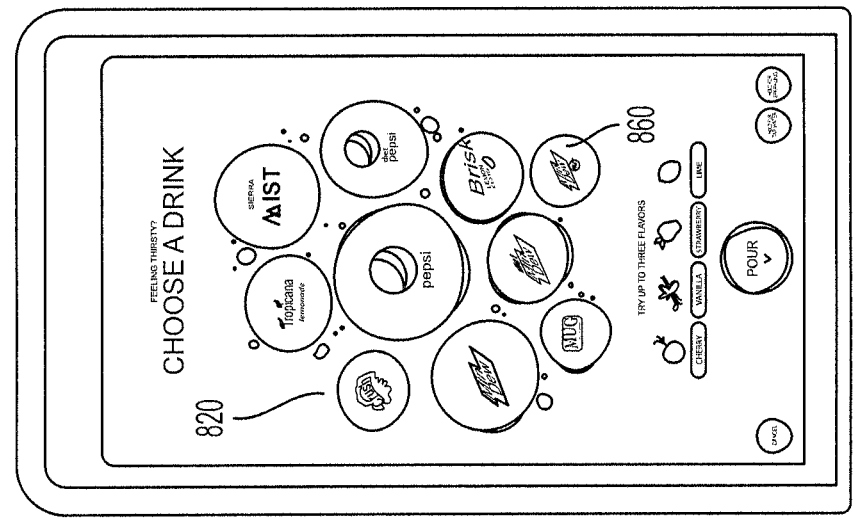
Figure 8A:
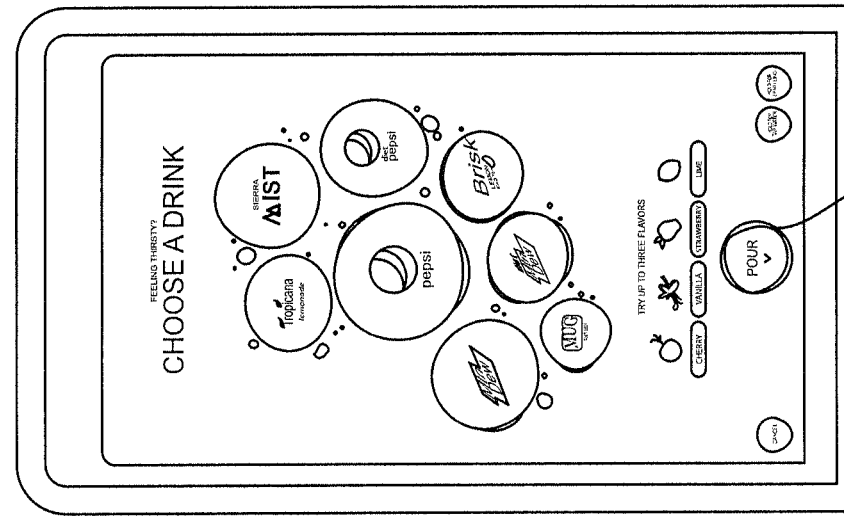

FIGS. 8A-C depict an example embodiment of a configurable touch display 800. In the embodiment illustrated, various objects (graphics, other visual information) may be made visible to a user, through use of lighting unit 330 and mask layer 400. In FIG. 8A, a number of objects may be visible to the user. The visible objects may be those objects behind the mask layer 400 that have been illuminated by lighting unit 330. In some embodiments, each of the visible objects may be user selectable through touch of the surface (the touch panel 310) over the visible object. In FIG. 8B, lighting unit 330 may illuminate additional regions of mask layer 400, thereby making visible additional objects, such as objects 820 and 860. In FIG. 8C, lighting unit 330 may illuminate more regions of mask layer 400, thereby making visible additional objects, such as objects 810, 830, 840 and 850. Thus it should be recognized that the configuration of touch display 800 may be modified through use of illumination to make visible various objects for user selection.

In embodiments without a mask layer 400, illumination may be used to guide a user through the steps of item selection, even though non-selectable items may be visible to the user.

In some embodiments, lighting unit 330 may be controlled to direct or lead a user through an interaction to select a beverage. For example, particular portions of printed display 320 may be illuminated in accordance with a sequence related to steps of an interaction. This may help simplify an interaction for a user. For example, artwork or graphics (objects) associated with available beverage selections may first be illuminated, such as object 820, in order to help the user make a beverage selection. Next, illumination may be applied to flavoring selections, such as objects 850 and 840. Finally, illumination may be applied to the "Pour" object 870 to alert the user that the beverage dispensing process has progressed to the final stage and the beverage may be dispensed.

In some embodiments, touch display 800 may be configured based on availability of a beverage product or a flavoring. For example, should a flavoring be unavailable, control unit 340 may control lighting unit 330 to not illuminate objects related to that flavoring.

In some embodiments, the printed display 320 may include a multilayer, translucent film. Illumination from lighting unit 330 may make a particular layer more visible while others may be less visible. For example, one layer of the multilayer film may provide images related to carbonated beverages while another layer may provide images related to juices.

In some embodiments, touch display 800 may be configured based on the time of day. For example, during morning hours, control unit 340 may control lighting unit 330 to illuminate objects related to juices while during afternoon or evening hours, control unit 340 may control lighting unit 330 to illuminate objects related to carbonated beverages. In some embodiments, various layers of printed display 320 may be illuminated for particular periods of a day. In other embodiments, configuration may allow a beverage dispenser to support more beverage or ingredient choices than would normally fit in the space provided by the display. In these embodiments, a user selectable area may be provided to allow the user to display additional choices. For example, a selectable area may cause re-configuring of the touch display 800 through the illumination of a different layer of printed display 320.

In some embodiments, a proximity sensor may be used to detect the presence of a user. The proximity sensor may include an optical sensor. In some embodiments, the behavior of touch display 800 may change, depending on the presence of a user. For example, when no user is detected nearby, the user interface may enter an "attract" mode wherein the user interface may use illumination or sound to attract the attention of an un-engaged, or not yet engaged, user. In another example, when a user is detected in proximity, the user interface may enter a "ready" mode where it may be responsive to an initial user input. Certain portions of printed display 320 may be provided with illumination in order to help the user with operation of touch display 800. For example, objects typically selected first in an interaction may be illuminated to draw the user's attention to those objects.

When a user selects an object in the user interface, various portions of printed display 320 may be provided with illumination. Continuing with the beverage dispenser example, if a particular beverage is selected, a portion related to that beverage may be illuminated while portions related to other beverages may not be illuminated, thereby providing feedback to the user that the selection has been recognized.

Also, once a beverage has been selected, various other portions of printed display 320 may be provided with illumination to indicate a valid next selection for the user. For example, a "pour" portion may be illuminated or a flavor addition portion may be illuminated to indicate to the user that either of these portions are valid next selections.

In addition, after beverage selection, various flavor addition portions may be illuminated to indicate to the user that they are selectable. As disclosed above, in some embodiments, various intensities of illumination may be provided, for example, a half intensity illumination may indicate a possible user selection while a full intensity illumination may indicate that a user has selected the object. In some embodiments, a user may deselect an object whereby the illumination may return to a half intensity illumination to indicate that the object has been deselected and is again available for selection by the user.

In some embodiments, a limited number of flavor selections may be allowed. For example, in embodiments where three flavor selections may be allowed, upon selection of a third flavor, illumination of objects corresponding to any additional flavor additions may be turned off or lowered in intensity and the touch panel may be unresponsive to user input in areas corresponding to these objects.

In some embodiments, once the user has progressed through beverage and any flavor selection, the interface may be ready for the user to select dispensing of the beverage. The portion of printed display 320 corresponding to the dispensing command e.g. pour 870, may be illuminated. In some embodiments, the pour area on touch panel 310 may remain available such that a user may select it multiple times to dispense beverage to top off a container or in order to allow the user to taste the beverage and then continue dispensing with an additional touch to the corresponding area.

The touch user interface may timeout in some embodiments, so that user input may no longer be accepted from certain areas and the interface may reset to an initial state.

In some embodiments, the interface may include a "cleaning" mode wherein the touch panel may become unresponsive to input for a predetermined period, such as 15 seconds. The "clean" mode disables user inputs to facilitate wiping or otherwise touching of the user interface for cleaning, without dispensing beverages. At the expiration of the predetermined period, the interface may exit the "cleaning" mode and return to normal operation.

In some embodiments, touch display 800 may be manually configured and/or reconfigured. For example, reconfiguration of the touch display from that depicted in FIG. 8A to that of FIG. 8B or 8C may be accomplished by the manual replacement of one or more removable printed graphics, such as printed display 320. In some embodiments, the manual replacement may be communicated to control unit 340. For example, the printed display may include a code, such as a may be applied via conductive printing, and the code may be read by a sensor, such as sensor unit 730. In other embodiments, manual replacement of the printed display 320 may be communicated to control unit 340 by manual input.

Figure 9:
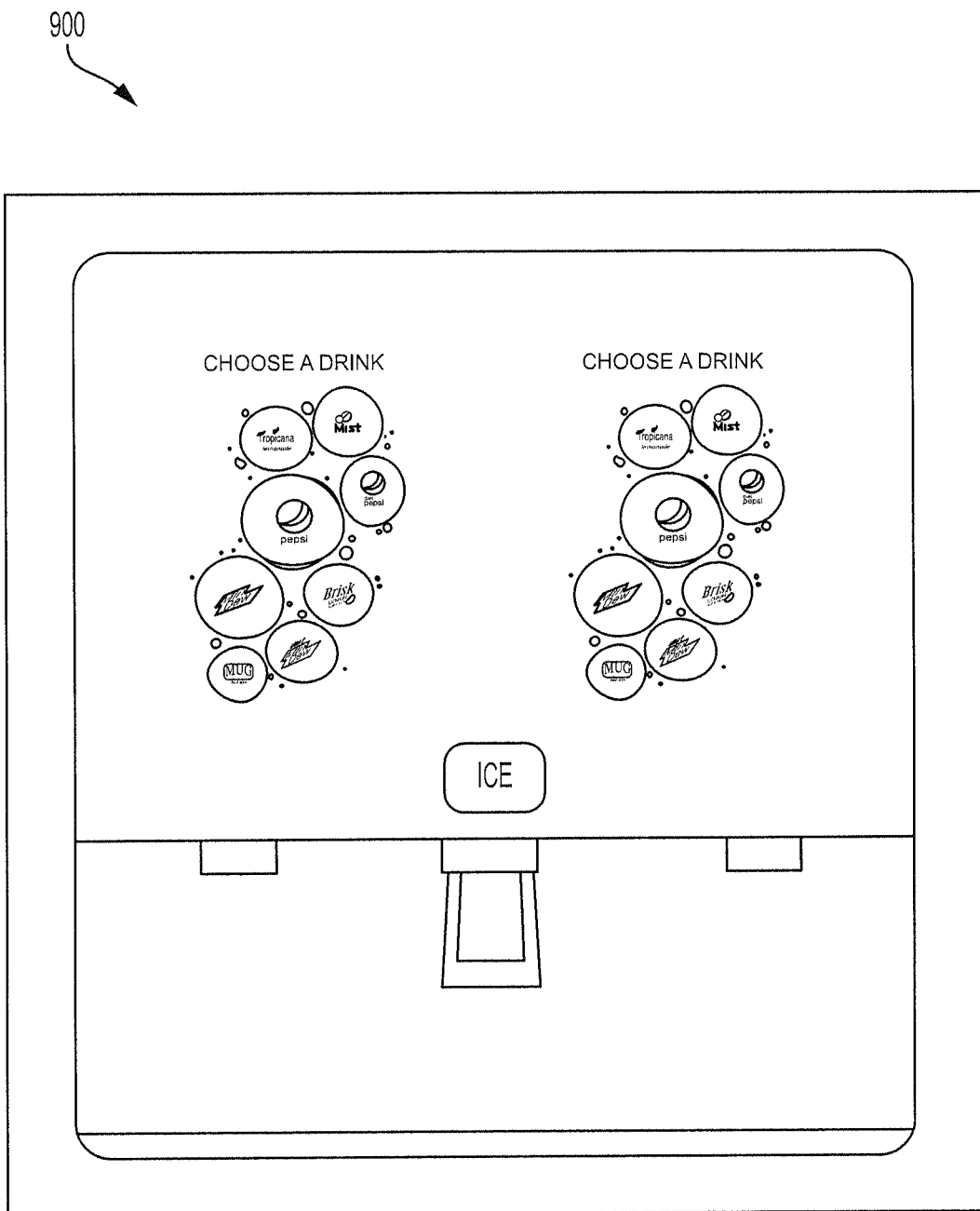
FIG. 9 illustrates an embodiment of a beverage dispenser in accordance with aspects of the present disclosure.

FIG. 9 illustrates an embodiment of a beverage dispenser 900 in accordance with aspects of the present disclosure. In the embodiment illustrated, beverage dispenser 900 includes two touch displays 200, in order to provide for dispensing of two beverages independently at the same time. It should be understood by those skilled in the art that three or more touch displays may be included in some embodiments.

Figure 10B:
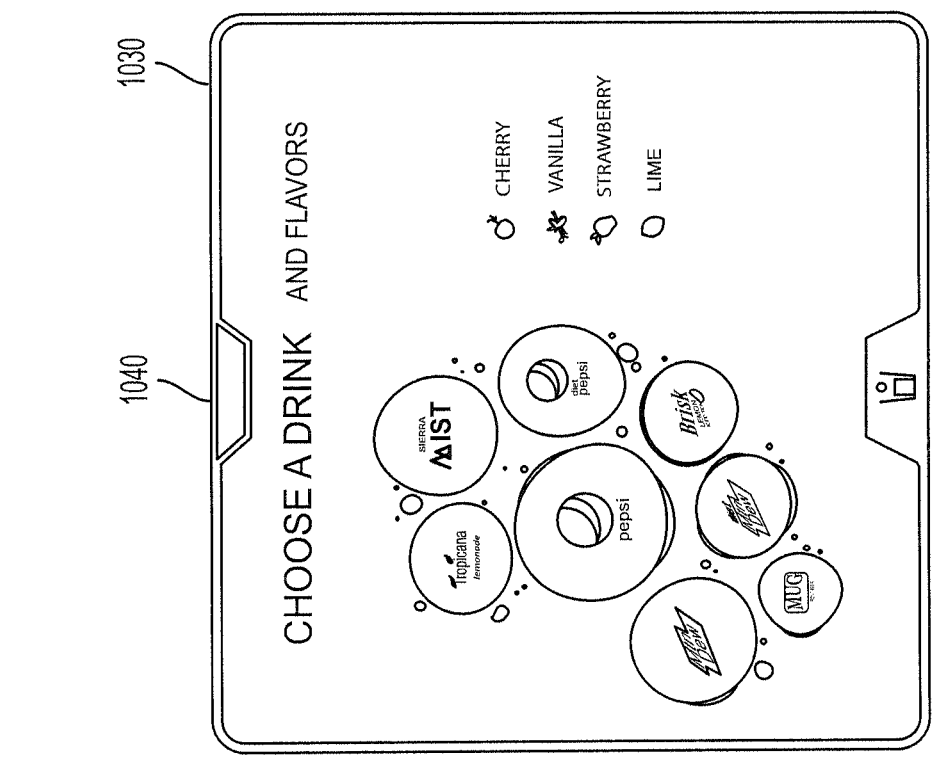
FIGS. 10A-B illustrate an example distributed beverage dispensing system in accordance with aspects of the present disclosure.
Figure 10A:
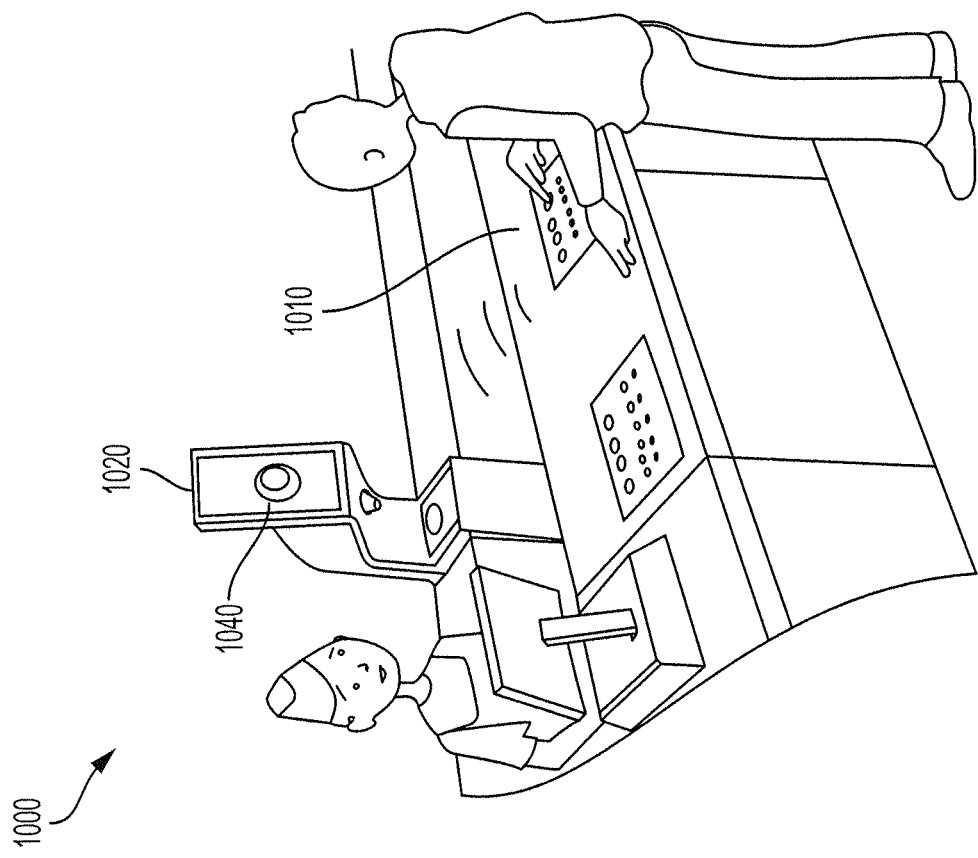

FIG. 10A illustrates an example distributed beverage dispensing system 1000 as in some embodiments. In some embodiments, remote touch display 1010 may be located remotely from beverage dispenser 1020, allowing users to select beverages without having access to the beverage dispenser. As in the illustration shown, remote touch display 1010 may be placed on a counter top, accessible by a user, while beverage dispenser 1020 may be positioned behind the counter for access by vending personnel. In some embodiments, remote touch display 1010 may communicate with beverage dispenser 1020 using wireless communications, including infrared, Wi-Fi or Bluetooth, among others. In other embodiments, remote touch display 1010 may communicate with beverage dispenser 1020 through a wired connection. In some embodiments, remote touch display 1010 may communicate directly with beverage dispenser 1020, while in other embodiments, communication may be via an intermediary, such as a billing or order entry system.

In some embodiments, beverage dispenser 1020 may include a similar user interface as remote touch display 1010. In other embodiments, beverage dispenser 1020 may include a different user interface, for example, the user interface may not have a touch panel. In some embodiments, the user interface of beverage dispenser 1020 may provide illumination corresponding to selections made by the user via remote touch display 1010.

In some embodiments, remote touch display 1010 may include printed electronics. Such an embodiment may enable the manufacture of remote touch display 1010 in the form of a flexible mat. Illumination may be provided by LED lights, for example, printed LEDs, included in the remote touch display 1010.

FIG. 10B illustrates an embodiment of a remote touch display 1030 including an infrared transmitter 1040 for communicating with a beverage dispenser, such as beverage dispenser 1020.

Figure 11:
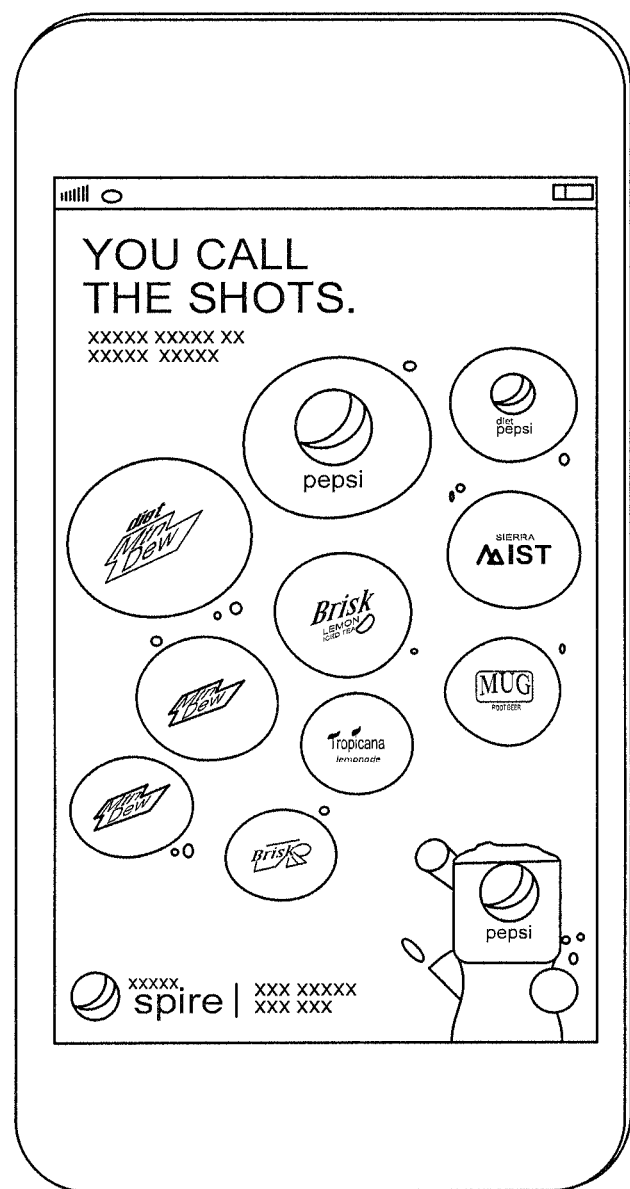
FIG. 11 illustrates an example mobile application interface as in some embodiments in accordance with aspects of the present disclosure.

FIG. 11 illustrates an example mobile application 1100 in accordance with aspects of the present disclosure. In some embodiments, the mobile application may be executed on a mobile device, such as a mobile phone, tablet computer, laptop, etc. Mobile application 1100 may allow user selection of beverages for dispensing via a beverage dispenser, such as beverage dispenser 1020. Communication between the mobile application and beverage dispenser 1020 may be via any supported wireless means, such as infrared, Wi-Fi or Bluetooth, among others. Mobile application 1100 may provide users with the ability to make beverage selections while in line, thereby reducing wait times.

In some embodiments, mobile application 1100 may be used with other types of beverage dispensers or other product dispensers, and may allow the user to choose beverages or products without touching the dispenser. This may be preferred by some users as it allows them to complete the selection process on a personal device, such as the mobile devices listed above, without needing to interface with the dispenser. This can be particularly useful because the user may become familiar with mobile application 1100 and not have to learn how to use various dispenser interfaces.

Figure 12:
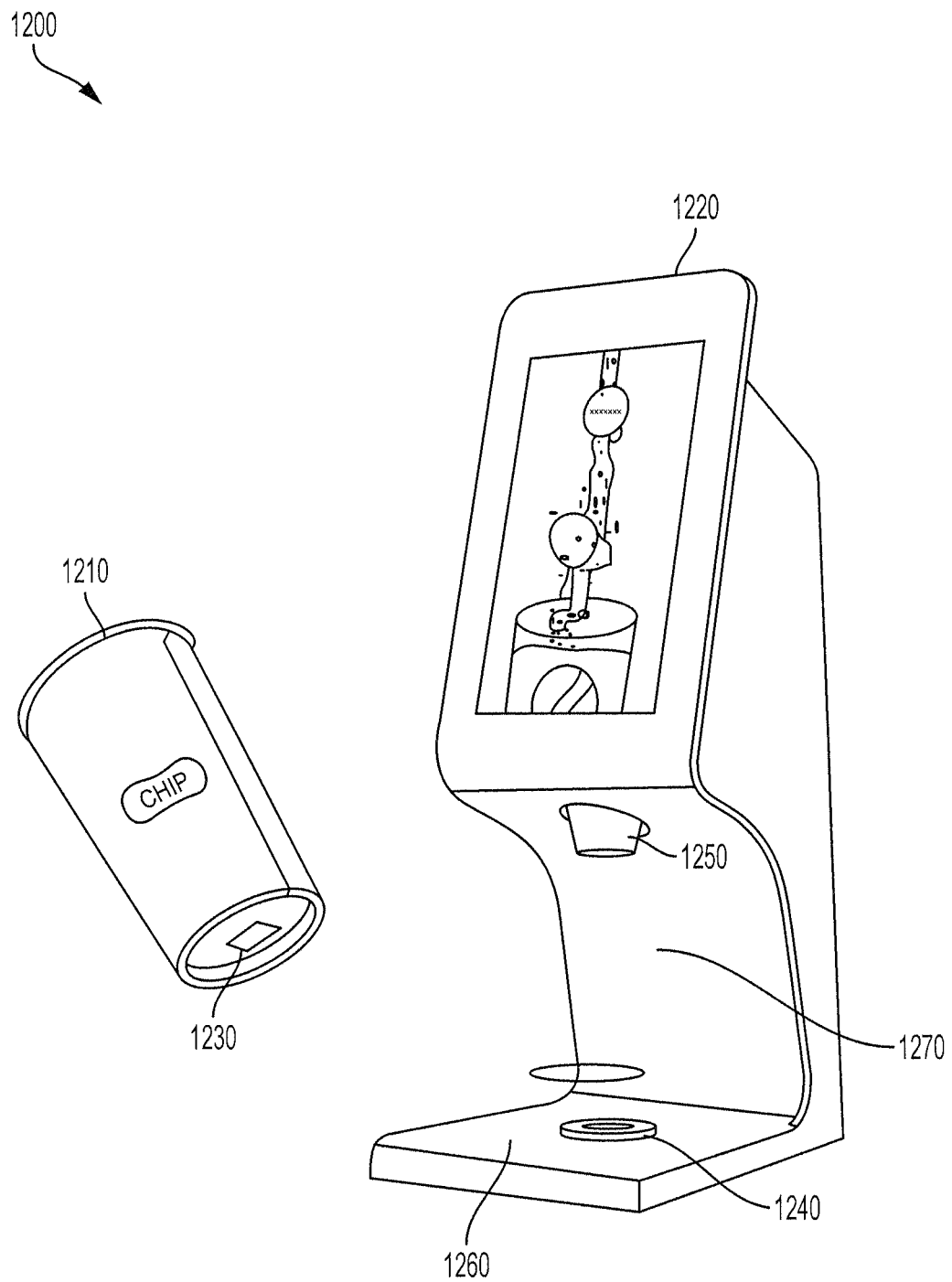
FIG. 12 illustrates an embodiment of a beverage dispenser in accordance with aspects of the present disclosure.

Another aspect of the disclosure may provide for an identifier associated with a cup, so that various advantageous processes may be realized. FIG. 12 illustrates an example cup identification system 1200 including a cup 1210 and a beverage dispenser 1220. Although a cup is referred to in the description herein, it would be understood by those skilled in the art that various other containers may also be used, given these teachings, including various shapes and sizes of bottles, etc. In some embodiments, cup 1210 may include an identifier 1230 so that it may be recognized by beverage dispenser 1220. The dispensing system may have a sensor 1240, such as a projected capacitance sensor, to detect the presence and/or identify the cup by a change in an electrical field generated by sensor 1240. In some embodiments, sensor 1240 may be a mutual capacitive sensor and include support for multi-touch detection. Sensor 1240 may be included in sensor unit 730, described above. Sensor 1240 may be positioned in various locations, depending on the embodiment. In some embodiments, the sensor 1240 may be positioned horizontally, affixed to drip tray 1260. In other embodiments, sensor 1240 may be positioned vertically, for example, affixed to a supporting member 1270 beneath dispenser port 1250.

In some embodiments, identifier 1230 may include conductive printing and/or semiconductors capable of communications over various frequencies, using various protocols, on cup 1210 in a pattern that may be read by the sensor 1240. In some embodiments, the conductors may include conductive ink. In various embodiments, the conductors may be printed on the bottom of the cup, in between layers of cup material, a surface of the cup or on a sticker that may be affixed to the cup. The printed conductors may be visible or visible markings may be added, so that the user may recognize the presence of the printed conductors. For example, visible markings may contain a message to the user conveying information about a feature associated with the cup, such as "two-drink limit" or "unlimited drinks". In some embodiments, the marking may be artwork or graphics.

In some embodiments, when cup 1210 is placed in close proximity to sensor 1240, the pattern of conductors may be recognized as a multi-touch input by the sensor 1240. Using inputs from the sensor, the pattern can be captured and the cup identified, for example by control unit 340. In some other embodiments, the shape and position of each printed conductor may be read by the sensor.

Sensor 1240 may be positioned so that markings can be read when cup 1210 is placed in a dispensing position. In other embodiments, sensor 1240 may be positioned in various other locations such that the user may swipe or hold the cup near the sensor 1240 before dispensing beverage.

Some existing beverage dispensers can recognize a cup containing an RFID, however, a problem with these existing solutions is that the RFID adds a significant cost to the cup.

The identifiers disclosed herein may provide a lower cost solution, in some embodiments.

Figure 13:
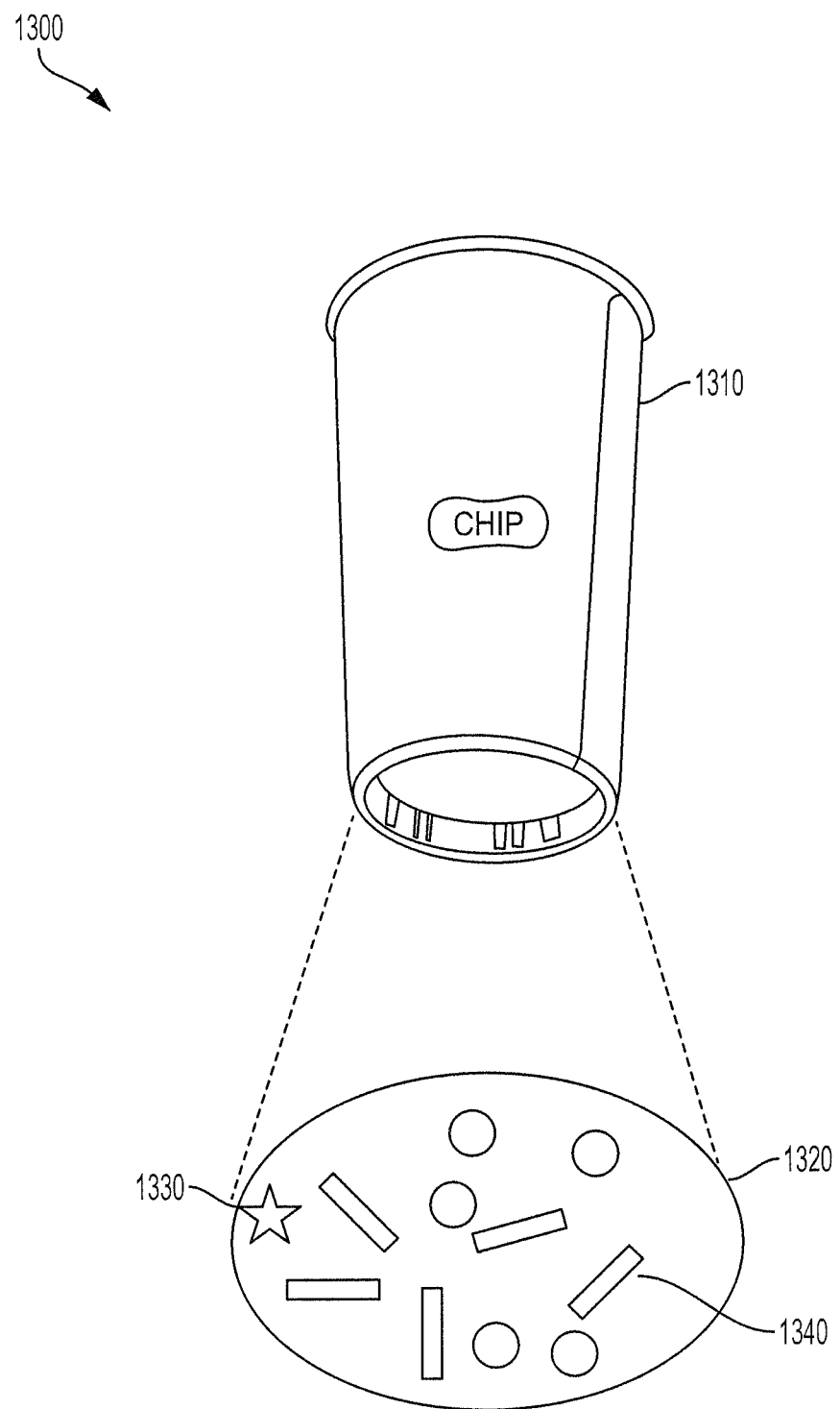
FIG. 13 illustrates an embodiment of a cup in accordance with aspects of the present disclosure.

FIG. 13 illustrates an example embodiment of a cup 1300 according to some aspects of the disclosure. In some embodiments, cup 1310 may include markings of printed conductors on an exterior surface. Item 1320 represents an enlarged view of the bottom of cup 1310. In the embodiment shown, the printed conductor markings are visible on item 1320. One or more marking 1330 may be used by sensor 1240 to determine the orientation of the cup. A star is depicted in the illustration, but it should be understood that various markings may be used to the same effect. Other markings 1340 may be read as the identification of the cup. In some embodiments, the printed conductors may not be visible to a user. For example, the printed conductors may be obscured by a covering, such as a layer of paper in a paper cup. In some embodiments, the printed conductors may be printed using a material that visually blends with the cup. In other embodiments, the printed conductors may be small whereby they may not be visible to the naked eye.

In various embodiments, a range of numbering or identification methods may be used to provide a unique identification for each cup. For example, one skilled in the art would appreciate that a dot or line pattern may be used, such as is found in common bar codes. Alternatively, numeric print may be used. A series of letters or other shapes may be used. Any pattern or geometry recognizable by sensor 1240 and containing a sufficient number of unique arrangements may be used.

In some embodiments, the ink of the printed conductors may wash away or become otherwise unrecognizable when exposed to condensation or moisture. This feature may be used to provide a one-time use cup where condensation may wash away the ink during first use of the cup so that it can no longer be read by sensor 1240. Dispenser 1220 may not dispense beverage to a cup that cannot be identified.

FIG. 14 illustrates an embodiment of a printed level sensor 1400 in accordance with aspects of the present disclosure. A bag-in-a-box (BiB) 1410 may be used in some embodiments to provide beverage ingredients, such as soft drink syrup, to a beverage dispenser, such as beverage dispenser 100. In some embodiments, multiple BiB 1410 may be stacked or placed on rack 1420. The BiB 1410 may include hoses to connect the BiB to beverage dispenser 100. In some embodiments, BiB 1410 may include a bag or bladder, composed of plastic or metalized film within a corrugated fiberboard box. A problem with a bag-in-a-box is that it is typically constructed of an opaque material, making determining how much contents remain in the box at any time difficult. Often, vendors are not aware of the level and may run out unexpectedly. This can especially be a problem during a rush hour or other busy time, when a vendor may not have time to replace the bag-in-a-box with a full one. If the user could be provided a remaining level reading, it would improve operations, but a low cost solution is desired. An aspect of this disclosure may include an electronic level sensor, printed on a surface of the bladder, such as an inner surface, such that a capacitive measurement may correspond to a level of contents within the bladder.

In some embodiments, the level sensor may include multiple printed conductors spaced a predetermined distance apart and exposed to liquid contents of the bladder. In other embodiments, the level sensor may comprise a single printed conductor. The printed conductor or conductors may be electrically connected to an exterior of the BiB 1410, for example by passing through a hole in the BiB, to enable external connection to a sensor, such as a capacitance sensor.

As the level of contents decreases during use, the reading of a sensor associated with the printed conductors changes, thereby indicating a level of the contents. Printed conductors on the inside may change a capacitance as the level of contents changes. The level sensor may be included in sensing unit 730, discussed above.

In some embodiments, rack 1420 may transmit readings from the sensor to external monitoring equipment, for example, to beverage dispenser 100, using wireless or wired communications.

Figure 15:
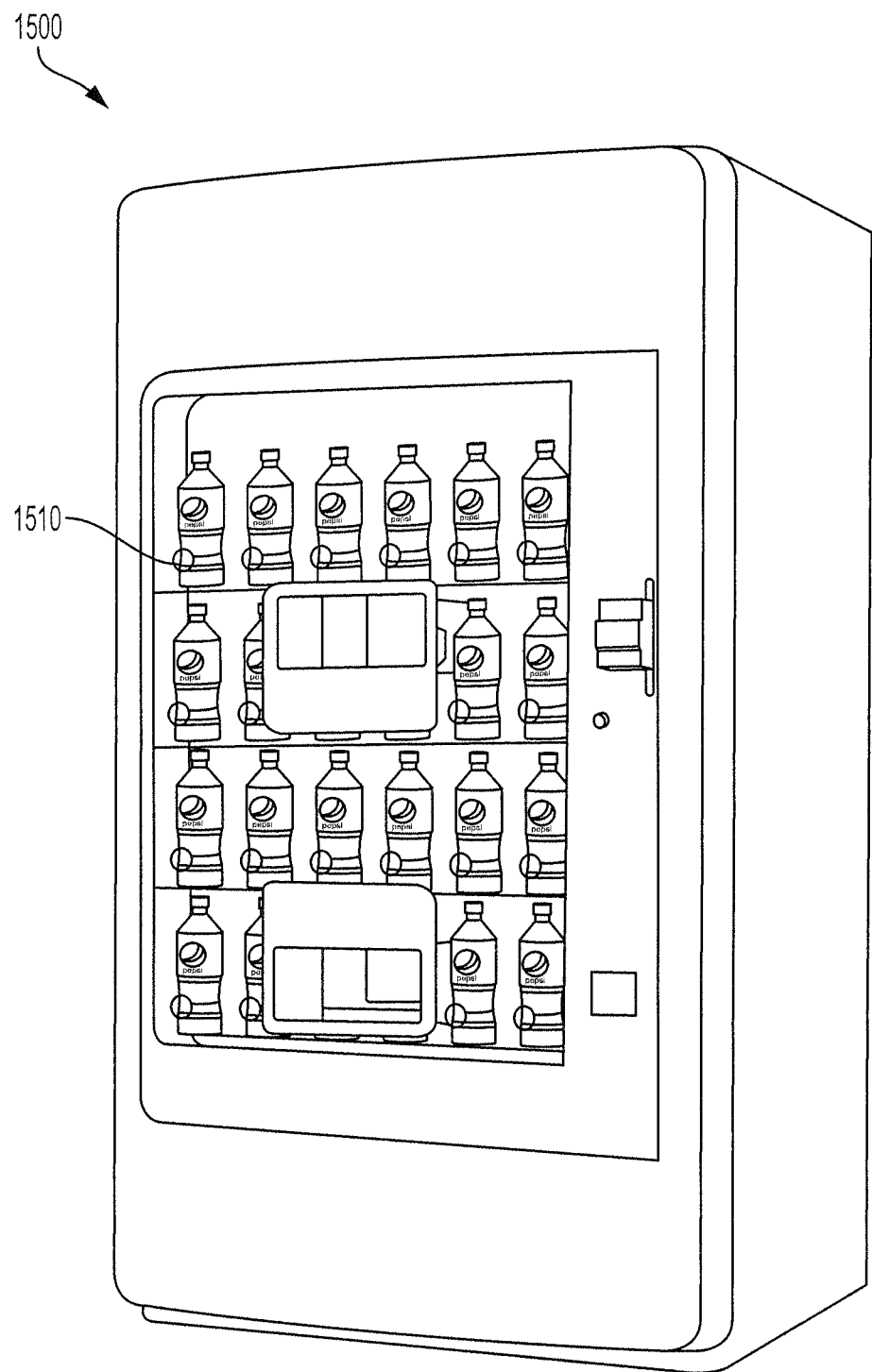
FIG. 15 illustrates an embodiment of a vending machine in accordance with aspects of the present disclosure.

FIG. 15 illustrates an embodiment of vending machine 1500 in accordance with aspects of the present disclosure. In some vending machines, product may be displayed through a window so that a user may see items available for purchase. A printed display, such as circle 1510, may be affixed or printed onto the window in a position corresponding to the item behind the window. The printed or affixed visual display may provide guidance to a user as to where to select. A touch panel may be placed over the window, or the window itself may include touch capability, enabling a user to touch circle 1510 to make a beverage selection.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A beverage dispensing system, comprising:
   a dispensing port configured to dispense a beverage;
   a transparent touch panel comprising one or more touch sensitive areas;
   a printed display panel disposed behind the transparent touch panel, the printed display panel comprising visual markings defining one or more portions associated with selectable options for a user of the beverage dispensing system, wherein the one or more portions correspond to the one or more touch sensitive areas;
   a control unit configured to receive input from the transparent touch panel and cause the dispensing port to dispense the beverage based on the input; and
   one or more lights, wherein the control unit is configured to sequentially illuminate a first light of the one or more lights to illuminate a first visual marking and a second light of the one or more lights to illuminate a second visual marking based on the input.

2. The beverage dispensing system of claim 1, further comprising:
   a proximity sensor in communication with the control unit, the proximity sensor configured to detect a presence of the user in proximity to the transparent touch panel.

3. The beverage dispensing system of claim 2, the control unit further configured to control the one or more lights to provide a first lighting mode or a second lighting mode, depending on a signal from the proximity sensor.

4. The beverage dispensing system of claim 1, further comprising:
   a mask layer disposed between the printed display panel and the transparent touch panel, the mask layer comprising at least one shaded region which becomes transparent when illuminated, thereby exposing the printed display panel.

5. The beverage dispensing system of claim 1, wherein the transparent touch panel and the printed display panel are remote from the dispensing port.

6. The beverage dispensing system of claim 5, further comprising:
a transmitter, the control unit further configured to control the transmitter to transmit data corresponding to the user selection.

7. The beverage dispensing system of claim 6, wherein the transmitter communicates wirelessly with the dispensing port.

8. The beverage dispensing system of claim 1, wherein the selectable options comprise one or more of beverage options, flavor additions, ingredient additions, flavor removals, ingredient removals, dispensing commands, and a cancel selection.

9. The beverage dispensing system of claim 1, wherein the printed display panel comprises paper, cardboard, or translucent film.

10. The beverage dispensing system of claim 1, wherein the visual markings are printed, painted, or photocopied on the printed display panel.

11. The beverage dispensing system of claim 1, wherein the printed display panel comprises multiple layers.

12. The beverage dispensing system according to claim 1, wherein the one or more lights are illuminated at a first intensity, and wherein in response to an input, the one or more lights are illuminated at a second intensity that is greater than the first intensity.

13. The beverage dispensing system according to claim 1, wherein the one or more lights are illuminated in a first color, and in response to receipt of an input, the one or more lights are illuminated in a second color that differs from the first color.

14. A beverage dispensing system, comprising:
a dispensing port configured to dispense a beverage;
a printed display, the printed display comprising visual markings defining one or more portions;
a transparent touch panel, overlaid on the printed display such that the visual markings are visible through the touch panel;
a control unit, configured to receive input from the touch panel, the input indicative of a user selection corresponding to one of the one or more portions; and
a lighting unit controlled by the control unit, wherein the control unit is configured to move the lighting unit such that the lighting unit sequentially illuminates a first group of the visual markings, and in response to receipt of an input corresponding to selection of a first visual marking from the first group of the visual markings, the control unit moves the lighting unit to illuminate a second group of the visual markings that differs from the first group of the visual markings.

15. The beverage dispensing system according to claim 14, wherein the first group of the visual markings corresponds to a beverage, and wherein the second group of visual markings corresponds to a flavoring or additive.

16. A beverage dispensing system, comprising:
a dispensing port configured to dispense a beverage;
a transparent touch panel comprising one or more touch sensitive areas;
a printed display panel disposed behind the transparent touch panel, the printed display panel comprising visual markings defining one or more portions associated with selectable options for a user of the beverage dispensing system, wherein the one or more portions correspond to the one or more touch sensitive areas;
a control unit configured to receive input from the transparent touch panel and cause the dispensing port to dispense the beverage based on the input; and
one or more lights controlled by the control unit, wherein the control unit is configured to selectively illuminate a first light of the lights such that a first portion of the printed display is illuminated, and upon receipt of the input, the control unit stops illuminating the first light and illuminates a second light of the one or more lights such that a second portion of the printed display is illuminated so as to guide a user to make a series of selections.

* * * * *